United States Patent
Reynolds

(10) Patent No.: US 11,287,995 B2
(45) Date of Patent: Mar. 29, 2022

(54) HEAP, GARBAGE COLLECTION, AND EMPTY-SENSITIVE OBJECT POOLS

(71) Applicant: Oracle International Corporation, Redwood Shores, CA (US)

(72) Inventor: Nathan Luther Reynolds, Rexburg, ID (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 16/877,314

(22) Filed: May 18, 2020

(65) Prior Publication Data

US 2021/0357139 A1 Nov. 18, 2021

(51) Int. Cl.
*G06F 3/06* (2006.01)

(52) U.S. Cl.
CPC .......... *G06F 3/0644* (2013.01); *G06F 3/0604* (2013.01); *G06F 3/0652* (2013.01); *G06F 3/0653* (2013.01); *G06F 3/0673* (2013.01)

(58) Field of Classification Search
CPC ..... G06F 3/0644; G06F 3/0652; G06F 3/0673
See application file for complete search history.

(56) References Cited

U.S. PATENT DOCUMENTS

| | | |
|---|---|---|
| 6,725,241 B1 | 4/2004 | Rodriguez et al. |
| 7,536,512 B2 | 5/2009 | Chetuparambil et al. |
| 7,761,487 B2 | 7/2010 | Bansal et al. |
| 8,051,267 B1 | 11/2011 | Chase |
| 9,110,790 B1 | 8/2015 | Joyce et al. |
| 9,369,530 B2 | 6/2016 | Shankar et al. |
| 2005/0262304 A1* | 11/2005 | Chow .............. G06F 12/023 711/133 |
| 2019/0265956 A1 | 8/2019 | Toub et al. |
| 2020/0210331 A1* | 7/2020 | Muchherla ............. G06F 3/061 |

FOREIGN PATENT DOCUMENTS

WO 2007/034769 A1 3/2007

OTHER PUBLICATIONS

Badam et al., "SSDAlloc: Hybrid SSD/RAM Memory Management Made Easy", Proceedings of the 8th USENIX conference on Networked systems design and implementation, Mar. 2011, pp. 211-224.

(Continued)

*Primary Examiner* — Edward J Dudek, Jr.
(74) *Attorney, Agent, or Firm* — Invoke

(57) ABSTRACT

Techniques for managing object pools within computer storage are disclosed. In some embodiments, a runtime environment determines, for a respective object pool allocated in volatile or non-volatile storage of a computing system, whether a new object has been added to the respective object pool within a threshold timeframe. Responsive to determining that a new object has not been added to the respective object pool within the threshold timeframe, the runtime environment removes a subset of one or more objects from the respective object pool. In some embodiments, the runtime environment monitors a set of one or more garbage collection metrics. Responsive to determining that the set of one or more garbage collection metrics have satisfied one or more thresholds, the runtime environment identifies and removes idle objects from at least one object pool.

20 Claims, 7 Drawing Sheets

(56) References Cited

OTHER PUBLICATIONS

Class GenericObjectPool, The Apache Software Foundation, available online at <https:///commons.apache.org/proper/commons-pool/api-2.4.1/org/apache/commons/pool2/impl/GenericObjectPool.html>, 2001-2015, 16 pages.

Object pool design pattern in PHP, available online at <https://docs.php.earth/php/ref/oop/design-patterns/object-pool/>, 2 pages.

Prashant Jain, "Evictor", Permission is granted to copy for the PLoP, available online at <http://UML.org.cn/sjms/pdf/PLoP2001_pjain1_1.pdf>, 2001, 8 pages.

* cited by examiner

HEAP, GARBAGE COLLECTION, AND EMPTY-SENSITIVE OBJECT POOLS

TECHNICAL FIELD

The present disclosure relates to managing pools of data objects within volatile and/or non-volatile computer storage. In particular, the present disclosure relates to techniques for implementing an object pool eviction algorithm that is sensitive to application and system performance attributes.

BACKGROUND

Object pools are part of a software design pattern deployed with the intent of improving runtime performance of an application. An object pool comprises a set of initialized objects that are ready to use by one or more client threads. A client thread of execution or process may request an available object from the pool rather than having to allocate and initialize the object on demand. When finished, the client may return the object to the pool. By maintaining a pool of initialized objects, the processing overhead incurred from creating, initializing and discarding objects may be reduced.

If not implemented correctly, object pools may cause more performance problems than they solve. In garbage collection-enabled runtime environments, object pools are a common source of running out of memory. Idle objects consume heap memory space, which may be significant when there are several object pools across a program during runtime. Further, idle objects reduce the amount of space available to allocate new objects, which may lead to more frequent garbage collection to free up space. Object pools may also increase the processing overhead of running garbage collection since a garbage collector may need to traverse the references in each pool's objects and move the objects to different locations in the heap.

One approach to limit the memory consumed by idle objects in an object pool is constraining the object pool to a fixed maximum size. According to this approach, if a client thread requests an object and the pool is empty, then the pool creates a new object. When the client thread returns an object and the pool is full, the object is discarded or deleted. While this approach constrains the amount of heap space consumed by idle objects, it may negatively impact central processing unit (CPU) performance. A spike in demand for objects that exceeds the maximum idle size triggers the creation of new objects. After the demand has waned, processing overhead may also be negatively impacted as the pool may need to discard several excess objects. In garbage collection-enabled runtime environments, spikes in demand may trigger additional garbage collection events to allocate space for the excess objects and, if the excess objects live long enough, a full garbage collection event. In manual memory managed runtime environments, the creation and deletion of excess objects may increase lock contention within a memory allocator as well as negatively impact CPU performance and memory usage.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
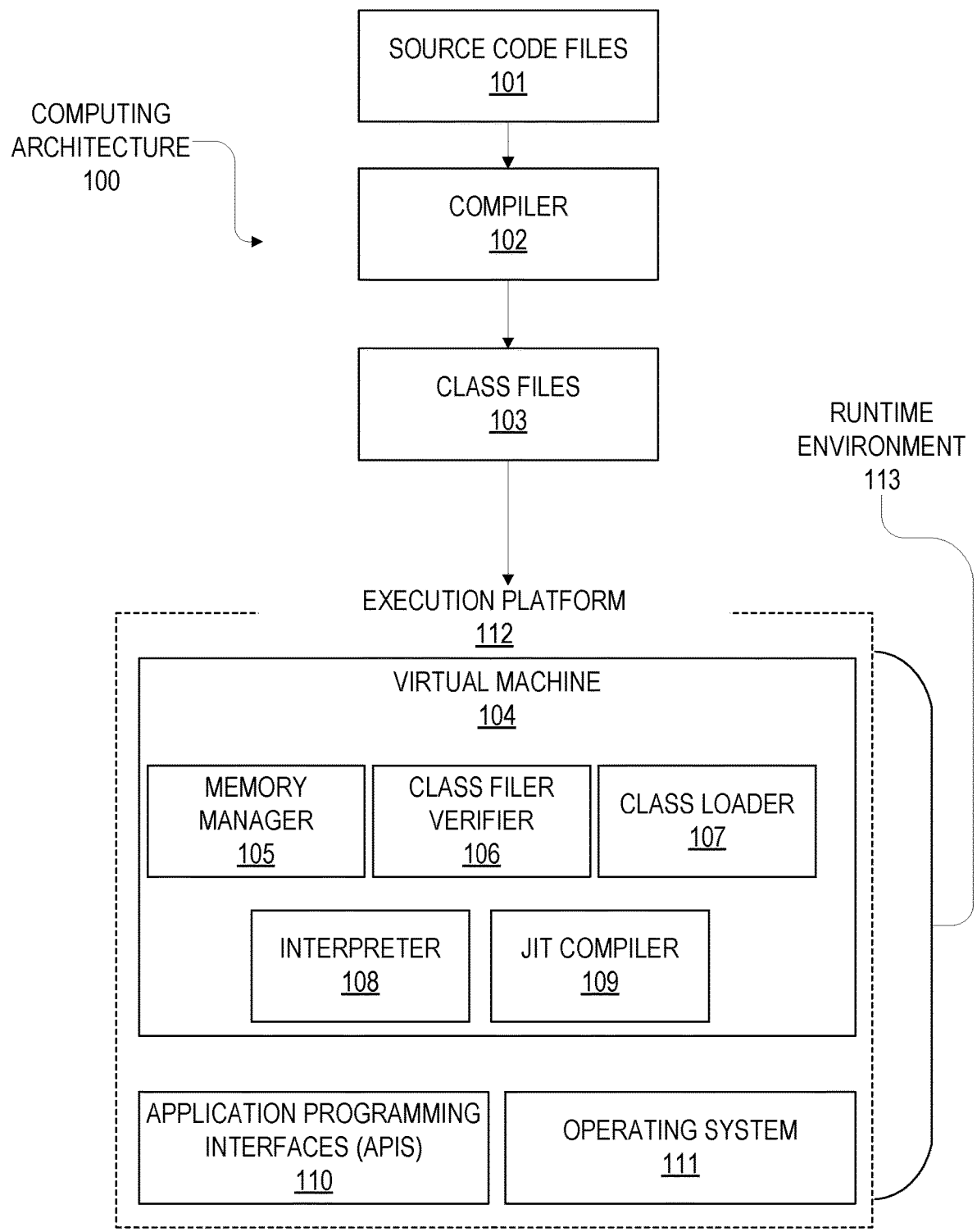
FIG. 1 illustrates an example architecture and runtime environment in which techniques described herein may be practiced in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
   2. RUNTIME ENVIRONMENTS
      2.1 ARCHITECTURAL OVERVIEW
      2.2 EXAMPLE VIRTUAL MACHINE ARCHITECTURE
   3. OBJECT POOL EVICTION PROCESSES
      3.1 SENSITIVITY TO NEW OBJECT CREATION
      3.2 SENSITIVITY TO MEMORY PRESSURE
      3.3 SENSITIVITY TO GARBAGE COLLECTION PRESSURE
      3.4 EXAMPLE COMBINED APPROACHES
   4. TUNING CONSIDERATIONS
      4.1 IDLE OBJECT SELECTION FOR EVICTION
      4.2 THRESHOLDS AND MEMORY PROFILING
   5. COMPUTER NETWORKS AND CLOUD NETWORKS
   6. HARDWARE IMPLEMENTATIONS
   7. MISCELLANEOUS; EXTENSIONS
   1. General Overview Techniques are described herein for implementing and managing object pools. In some embodiments, the techniques include an object pool eviction algorithm that is sensitive to application and/or system performance attributes. Example performance attributes may include, but are not limited to, metrics indicative of memory and/or processor pressure. The techniques allow for object pools to balance between competing pressures to reduce the memory overhead incurred by idle objects without significantly impacting processor overhead.

One approach for evicting objects from a pool involves maintaining an idle timeout for each object. If the object idles in the pool for at least the idle timeout, then the pool discards the object. A challenge with this approach is selecting an appropriate timeout value. If the idle timeout is set too small, then the pool may discard and create objects more frequently than optimal, triggering garbage collection (GC) sooner and potentially wasting CPU time. If the idle timeout is set too large, then the program may waste memory space on the idle objects, which may also trigger GC more frequently due to the reduced amount of memory for new allocations.

In some approaches and embodiments described herein, a runtime environment monitors object pools to determine whether the objects pools are creating new objects. An object pool that is not creating new objects may be indicative that there are an excessive number of idle objects in the object pool. The runtime environment may periodically check an object pool to determine whether a new object has been created within a threshold timeframe. If not, then the object pool may evict one or more idle objects. On the other hand, if an object has been created, then any idle objects within the pool are permitted to remain and not evicted. In this manner, the number of idle objects within an object pools in not constrained to a fixed number during runtime. If there is a spike in demand, then the number of idle objects in a pool increases to match the current demand for objects. Further, objects are not immediately discarded when returned by client threads of execution but may be configured to gradually decline, thereby mitigating processing overhead incurred from frequent allocations and deallocations. Another benefit is that memory profilers are much more likely to catch allocations since the object pools may be constrained from creating and freeing objects more quickly than the profiler's sampling rate.

Additionally or alternatively, the runtime environment may monitor and account for memory utilization metrics in determining whether to evict idle objects. In garbage collection-enabled runtime environments, the amount of available memory may be checked as part of or responsive to a garbage collection event, such as a full garbage collection event. In other environments, memory may be checked periodically and/or responsive to other events. If the amount of available memory is less than a threshold, then the runtime environment may clear all idle objects or some subset thereof that are currently allocated for a program.

Additionally or alternatively, a garbage collection-enabled runtime environment may monitor and account for garbage collection metrics in determining whether to evict idle objects. The garbage collection metrics may be indicative of processing overhead. Example metrics may include, but are not limited to, the percentage of time spent in garbage collection, the frequency of garbage collection events, and/or the distribution of different types of garbage collection events. The metrics may be compared to one or more thresholds to determine whether the thresholds have been reached or crossed. If so, then the runtime environment may clear all idle objects or some subset thereof that are currently allocated for a program. Thus, the pool size may grow to satisfy client demand but restricted from growing to such an extent that memory management degrades processor performance.

One or more embodiments described in this Specification and/or recited in the claims may not be included in this General Overview section.

2. Runtime Environments 2.1 Architectural Overview

FIG. 1 illustrates an example architecture and runtime environment in which techniques described herein may be practiced. Software and/or hardware components described with relation to the example architecture may be omitted or associated with a different set of functionality than described herein. Software and/or hardware components, not described herein, may be used within an environment in accordance with some embodiments. Accordingly, the example environment should not be constructed as limiting the scope of any of the claims.

As illustrated in FIG. 1, a computing architecture 100 includes source code files 101 which are compiled by compiler 102 into blueprints representing the program to be executed. Examples of the blueprints include class files 103, which may be loaded and executed by execution platform 112. Execution platform 112 includes runtime environment 113, operating system 111, and one or more application programming interfaces (APIs) 110 that enable communication between runtime environment 113 and operating system 111. Runtime environment 113 includes virtual machine 104 comprising various components, such as memory manager 105 (which may include a garbage collector), class file verifier 106 to check the validity of class files 103, class loader 107 to locate and build in-memory representations of classes, interpreter 108 for executing virtual machine code, and just-in-time (JIT) compiler 109 for producing optimized machine-level code.

In some embodiments, computing architecture 100 includes source code files 101 that contain code written in a particular programming language, such as Java, C, C++, C#, Ruby, Perl, and so forth. Thus, source code files 101 adhere to a particular set of syntactic and/or semantic rules for the associated language. For example, code written in Java adheres to the Java Language Specification. However, since specifications are updated and revised over time, source code files 101 may be associated with a version number indicating the revision of the specification to which source code files 101 adhere. The exact programming language used to write source code files 101 is generally not critical.

In various embodiments, compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by virtual machine 104 that is capable of running on top of a variety of particular machine environments. The virtual machine instructions are executable by virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which virtual machine 104 resides.

In some embodiments, virtual machine 104 includes interpreter 108 and a JIT compiler 109 (or a component implementing aspects of both), and executes programs using a combination of interpreted and compiled techniques. For example, virtual machine 104 may initially begin by interpreting the virtual machine instructions representing the program via the interpreter 108 while tracking statistics related to program behavior, such as how often different sections or blocks of code are executed by virtual machine 104. Once a block of code surpass a threshold (is "hot"), virtual machine 104 may invoke JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In other embodiments, runtime environment 113 may not include a virtual machine. For example, some static and stack-based environments do not execute programs using a virtual machine. A runtime environment may include supporting code, tools and/or other hardware/software components that implement a given program's execution. One or more components of the runtime environment may vary depending on the programming language of the source code, the hardware platform on which the program is executed, and/or the operating system version.

Source code files 101 have been illustrated as the "top level" representation of the program to be executed by execution platform 111. Although computing architecture 100 depicts source code files 101 as a "top level" program representation, in other embodiments source code files 101 may be an intermediate representation received via a "higher level" compiler that processed code files in a different language into the language of source code files 101.

In some embodiments, compiler 102 receives as input the source code files 101 and converts the source code files 101 into class files 103 that are in a format expected by virtual machine 104. For example, in the context of the JVM, the Java Virtual Machine Specification defines a particular class file format to which class files 103 are expected to adhere. In some embodiments, class files 103 contain the virtual machine instructions that have been converted from source code files 101. However, in other embodiments, class files 103 may contain other structures as well, such as tables identifying constant values and/or metadata related to various structures (classes, fields, methods, and so forth).

2.2 Example Virtual Machine Architecture

Figure 2:
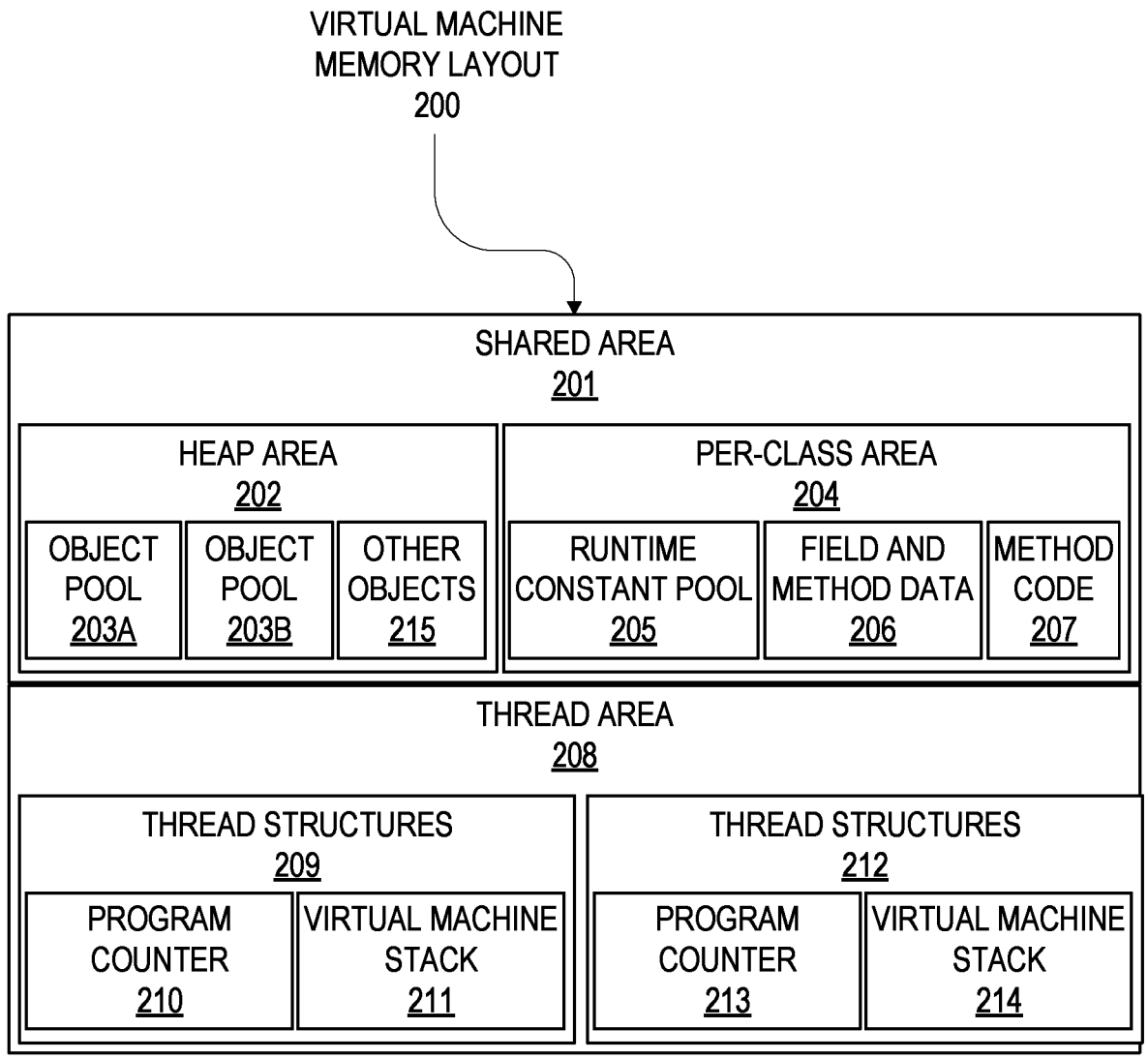
FIG. 2 illustrates example virtual machine memory layout according to some embodiments.

FIG. 2 illustrates example virtual machine memory layout 200 according to some embodiments. Virtual machine 104 may adhere to the virtual machine memory layout 200 depicted in FIG. 2. In other embodiments, the memory layout of virtual machine 104 may vary, such as by including additional components and/or omitting one or more of the depicted components, depending on the runtime environment. Although components of the virtual machine memory layout 200 may be referred to as memory "areas", there is no requirement that the memory areas are physically contiguous.

In the example illustrated by FIG. 2, virtual machine memory layout 200 is divided into shared area 201 and thread area 207. Shared area 201 represents an area in memory where structures shared among the various threads executing on virtual machine 204 are stored. Shared area 201 includes heap 202 and per-class area 204.

Heap 202 represents an area of memory allocated on behalf of a program during execution of the program. In some embodiments, heap 202 includes object pools 203a-b. Although only two pools are illustrated, the number of pools may vary from program to program. A pool may include zero or more initialized objects. Example objects include, but are not limited to, variables, methods, instances of a class, and data structures. An object may be referenced in memory by a corresponding identifier. The various threads executing on virtual machine 104 may request objects from an object pool, perform operations on the provided object, and return the object to the pool when finished. If there are no idle, initialized objects available in an object pool, then a new object may be allocated for a requesting thread, the object pool may return an error, or the object pool may block the requesting thread until another thread returns an object to the pool.

Heap 202 further includes other objects 215. Example objects may include, but are not limited to, class objects, strings, pointers, and variables. Some objects within heap 202 may not belong to or otherwise be associated with an object pool.

Per-class area 204 represents the memory area where the data pertaining to the individual classes are stored. In some embodiments, per-class area 204 includes, for each loaded class, run-time constant pool 205 representing data from a constant table of the class, field and method data 206 (for example, to hold the static fields of the class), and the method code 207 representing the virtual machine instructions for methods of the class.

Thread area 208 represents a memory area where structures specific to individual threads are stored. In FIG. 2, thread area 208 includes thread structures 209 and thread structures 212, representing the per-thread structures utilized by different threads. In order to provide clear examples, thread area 208 depicted in FIG. 2 assumes two threads are executing on the virtual machine 104. However, in a practical environment, virtual machine 104 may execute any arbitrary number of threads, with the number of thread structures scaled accordingly.

In some embodiments, thread structures 209 includes program counter 210 and virtual machine stack 211. Similarly, thread structures 212 includes program counter 213 and virtual machine stack 214.

In some embodiments, program counter 210 and program counter 213 store the current address of the virtual machine instruction being executed by their respective threads. Thus, as a thread steps through the instructions, the program counters are updated to maintain an index to the current instruction.

In some embodiments, virtual machine stack 211 and virtual machine stack 214 each store frames for their respective threads that hold local variables for a function. A frame is a data structure that may be used to store data and partial results, return values for methods, and/or perform dynamic linking. A new frame is created each time a method is invoked. A frame is destroyed when the method that caused the frame to be generated completes. Thus, when a thread performs a method invocation, virtual machine 104 generates a new frame and pushes the frame onto the virtual machine stack associated with the thread. Depending on the method invocation, the thread may request objects from one or more object pools 203a-b as previously described.

When the method invocation completes, virtual machine 104 passes back the result of the method invocation to the previous frame and pops the current frame off of the stack. In some embodiments, for a given thread, one frame is active at any point. This active frame is referred to as the current frame, the method that caused generation of the current frame is referred to as the current method, and the class to which the current method belongs is referred to as the current class.

3. Object Pool Eviction Processes 3.1 Sensitivity to New Object Creation

As previously mentioned, object pools 203a-b may include zero or more idle objects during program runtime. An idle object refers to one that is not currently in use by a client thread. An idle object may be in an initialized state ready to use by a requesting client. When a client requests an object from the object pool, any of the available idle objects may be provided. The provided object then transitions from an idle state to an in-use state. The client thread may then perform operations on the object, which may vary depending on the method being invoked and program instructions being executed. When the object is returned to the pool, the object may then be reset to the initialized state and becomes idle.

In some embodiments, the number of idle objects in object pools 203a-b is not fixed or restricted to a maximum threshold. The number of idle objects allowed to remain in a pool may vary from one point in time to another based in part on the current demand for objects. For example, if there is a sudden spike in demand, initially, there may not be enough idle objects in a pool for requesting clients. If a thread requests an object from an object pool and no idle objects are available, then the pool may create a new object to match current demand.

Once finished with an object, the thread returns the object to the pool. In periods of high demand, several idle objects may be returned to the pool within a relatively short timeframe. As a result, a relatively large number of idle objects may be in a pool at a given point in time. Without a fixed maximum threshold, however, the object pool does not immediately evict the idle objects. Idle objects are allowed to remain in the pool to match current demand, which avoids the process of repeatedly deleting idle objects to stay below an imposed threshold and creating new objects to satisfy incoming requests. Thus, the amount of memory allocations and deallocations may be reduced in periods of high demand.

As demand wanes, idle objects within an object pool may exceed the current demand, consuming more heap space than optimal. To prevent this, object pools may gradually evict idle objects if no new objects have been created within a threshold timeframe. Monitoring new creations provides a gauge for measuring current demand on a given object pool. A gradual eviction helps avoid frequent oscillations between allocating new objects and deleting existing objects.

Figure 3:
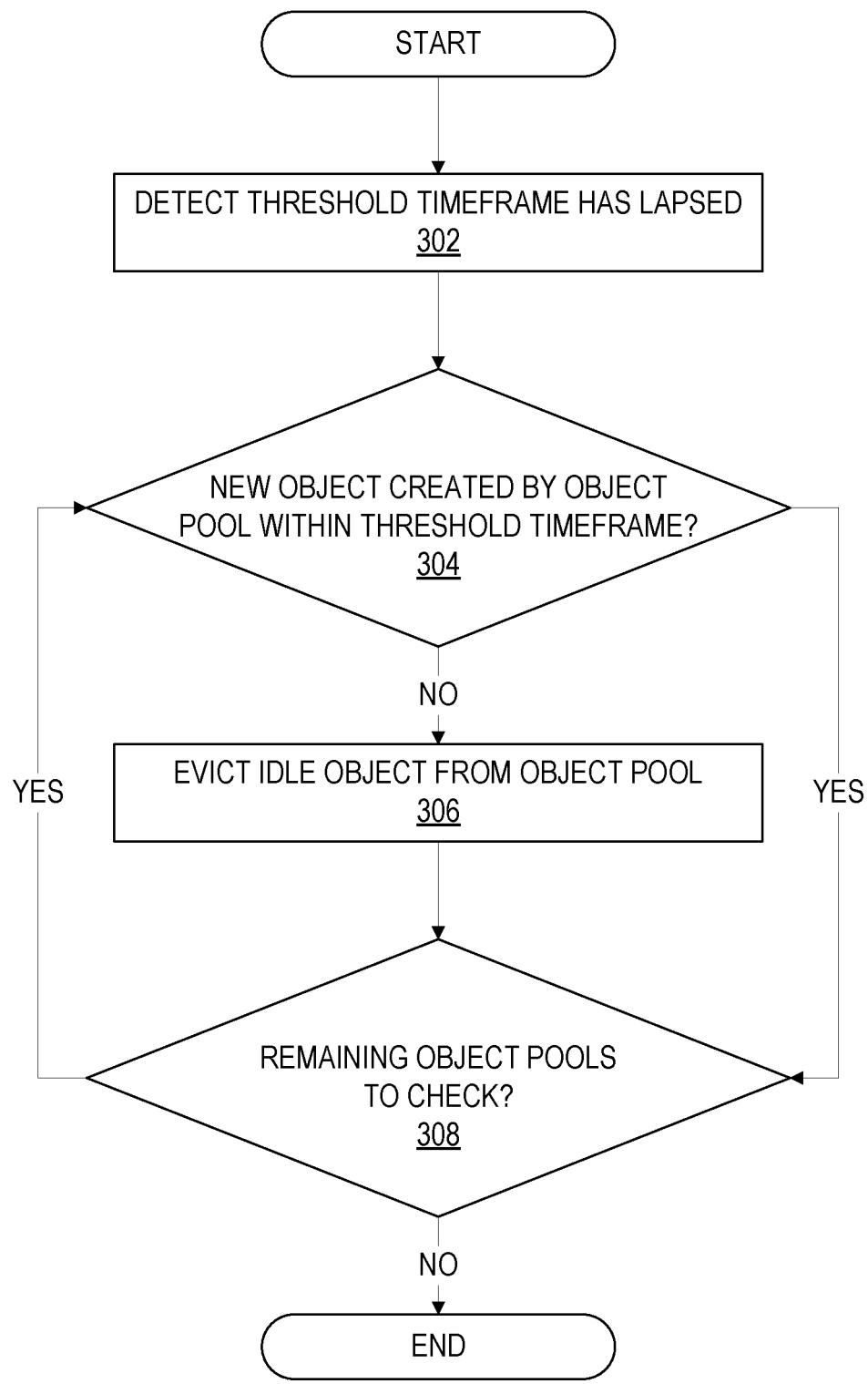
FIG. 3 illustrates an example set of operations for evicting objects from object pools based on demand in accordance with some embodiments.

FIG. 3 illustrates an example set of operations for evicting objects from object pools based on demand in accordance with some embodiments. One or more operations illustrated in FIG. 3 may be modified, rearranged, or omitted all together. Accordingly, the particular sequence of operations illustrated in FIG. 3 should not be construed as limiting the scope of one or more embodiments.

The set of operations includes detecting that a threshold timeframe has lapsed (operation 302). In some embodiments, runtime environment 113 schedules a job to run periodically, such as every second. However, the threshold timeframe may vary depending on the particular implementation.

In some embodiments, a thread within runtime environment 113 obtains the job and executes a check on an object pool to determine whether the object pool has created a new object within the threshold timeframe (operation 304). The thread may check a flag associated with the object pool during this operation, where the object pool sets the flag to true if a new object has been created. If the flag is true, then the thread may determine that the object pool has been created and no objects are evicted. The thread may further reset the flag to false.

If the object pool has not created a new object within the threshold timeframe (e.g., the flag is false since the previous check), then the one or more objects are evicted from the object pool (operation 306). In some embodiments, a single idle object is discarded to provide a gradual reduction. However, the number of idle objects that are evicted per iteration may vary depending on the particular implementation and between different object pools. An evicted object is no longer available for use by client threads. The object may be deallocated or otherwise deleted from memory.

In some embodiments, the one or more idle objects that are evicted are a subset of idle objects within the pool. Thus, after the subset of one or more idle objects have been evicted, another subset of idle objects may remain in the object pool. In some embodiments, an object pool may maintain a minimum threshold of idle objects, such as one idle object although the threshold may vary. If the minimum threshold has been reached, then the process may not evict the idle object, even if a new object has not been created within the threshold timeframe. In other cases, there may be no minimum threshold and the last idle object may be removed from a pool. New objects may subsequently be added to the pool as clients request and return objects.

Referring again to FIG. 3, the thread determines whether there are any remaining object pools to check (operation 308). If so, then the process returns to operation 304 for the next object pool and iterates through the operations until each remaining object pool has been checked. Thus, in a given cycle, a first object pool may evict an object if it is in low demand while a second object pool in higher demand may evict no objects, even if the second pool has more idle objects at the time the check is executed.

3.2 Sensitivity to Memory Pressure

In some embodiments, object pools 203a-b are sensitive to memory pressure. As previously mentioned, the performance benefits of maintaining initialized objects in object pools may be offset by running out of memory and/or frequent garbage collection events to free up space. To help reduce memory overhead when available space is scarce, runtime environment 113 may monitor memory utilization metrics and evict idle objects if the metrics satisfy one or more thresholds. For example, one or more idle objects may be evicted from object pools 203a-b if available memory is less than a threshold, a memory utilization rate exceeds a threshold, or memory throughput is below a threshold.

In garbage collection-enabled runtime environments, full garbage collection events are indicative that heap memory is experiencing pressure. Heap memory may include an area for young generation objects (objects that are newly allocated), old generation objects (objects that survive and age out of the young generation), and permanent generation objects (class and method metadata used by the virtual machine). Minor garbage collections evict objects from the heap in the young generation, whereas full garbage collections clean the entire heap. Minor garbage collections generally consume less CPU time and are triggered more frequently than full garbage collections. When memory is severely constrained, consecutive full garbage collection events may be consecutively triggered, degrading runtime performance of an application.

In some embodiments, runtime environment 113 checks the memory utilization metrics each time a full garbage collection is performed and evicts idle objects from one or more object pools if memory utilization exceeds a threshold. Runtime environment 113 may be configured such that minor garbage collection events do not trigger the check or eviction of idle object evictions. As previously indicated, minor garbage collection events are more frequent and not typically as indicative of severe memory pressure compared to full garbage collection events. Thus, the processing overhead of checking the metrics for each garbage collection may be avoided.

Figure 4:
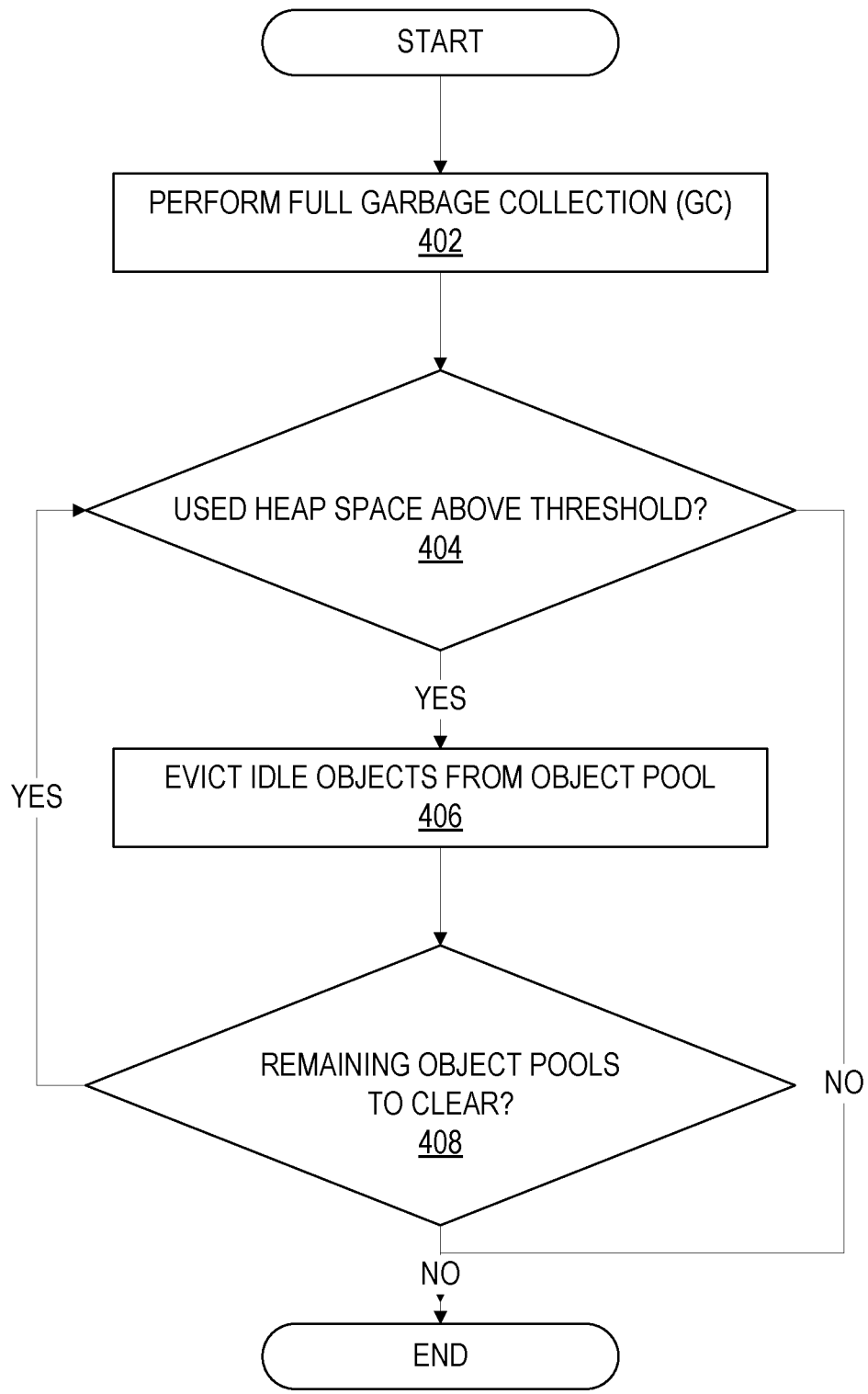
FIG. 4 illustrates an example set of operations for evicting objects from object pools based on memory pressure with some embodiments.

FIG. 4 illustrates an example set of operations for evicting objects from object pools based on memory pressure with some embodiments. One or more operations illustrated in FIG. 4 may be modified, rearranged, or omitted all together. Accordingly, the particular sequence of operations illustrated in FIG. 4 should not be construed as limiting the scope of one or more embodiments.

Referring to FIG. 4, runtime environment 113 performs a full garbage collection event (operation 402). The full garbage collection may evict one or more objects from heap 202. The evicted objects may not belong to an object pool.

Responsive to the full garbage collection event, runtime environment 113 determines whether the used space in heap 202 is above a threshold (operation 404). In some embodiments, the threshold is 50% of heap space after a full garbage collection. Java heaps are sized so that the program typically uses about 50% of the heap space after the full garbage collection, which allows enough space to allocate new objects without triggering garbage collection too frequently. However, the threshold may vary depending on the implementation and may be set to the typical heap space after a garbage collection for the program.

If the used space does not cross the threshold, then the process may end without evicting any idle objects from the object pools. Otherwise, if the used space is above the threshold after a full garbage collection, then runtime environment 113 selects an object pool and evicts the idle objects (operation 406). In some embodiments, all idle objects, if any, within the pool are evicted to maximally reduce the memory footprint. In other embodiments, a subset of idle objects may be evicted. For example, a minimum threshold (e.g., one) idle object may be left in the pool.

Runtime environment 113 next determine whether there are any remaining object pools to clear (operation 408). If so, then the process returns to operation 406 for the next object pool and iterates through the operations until each remaining object pool has been cleared of idle objects.

The process of FIG. 4 relates to garbage collection-enabled runtime environments. For manual managed runtime environments, such as C or C++ environments, a thread may periodically check a program's total random-access memory (RAM) usage. If the RAM usage exceeds a threshold, then the thread may execute operations 406 and 408 to clear idle objects in RAM from the object pools.

3.3 Sensitivity to Garbage Collection Pressure

In some embodiments, object pools 203a-b are sensitive to garbage collection pressure. As previously mentioned, frequent garbage collection may impact runtime performance of a program. To help reduce the likelihood of an undue number of garbage collection events, runtime environment 113 may monitor one or more garbage collection performance metrics and evict idle objects if the metrics satisfy one or more thresholds. For example, one or more idle objects may be evicted from object pools 203a-b if the percentage of time spent in garbage collection is above a threshold or the frequency of garbage collection is above a threshold.

In some embodiments, object pool sensitivity may vary depending on the type of garbage collection that is performed. Separate metrics may be maintained for different types of garbage collection events (e.g., full and minor), weighted, and/or otherwise aggregated and compared to one or more thresholds. For example, runtime environment 113 may compute a weighted percentage or average time, where minor garbage collections are weighted less heavily than full garbage collections to emphasize the higher performance impact of performing full garbage collections. The weighted sum may then be compared to a threshold to determine whether to evict objects from object pools 203a-b. As another example, runtime environment 113 may assign no weight to or otherwise ignore minor garbage collections. In yet another example, minor garbage collections and full garbage collections may be given equal weighting.

Figure 5:
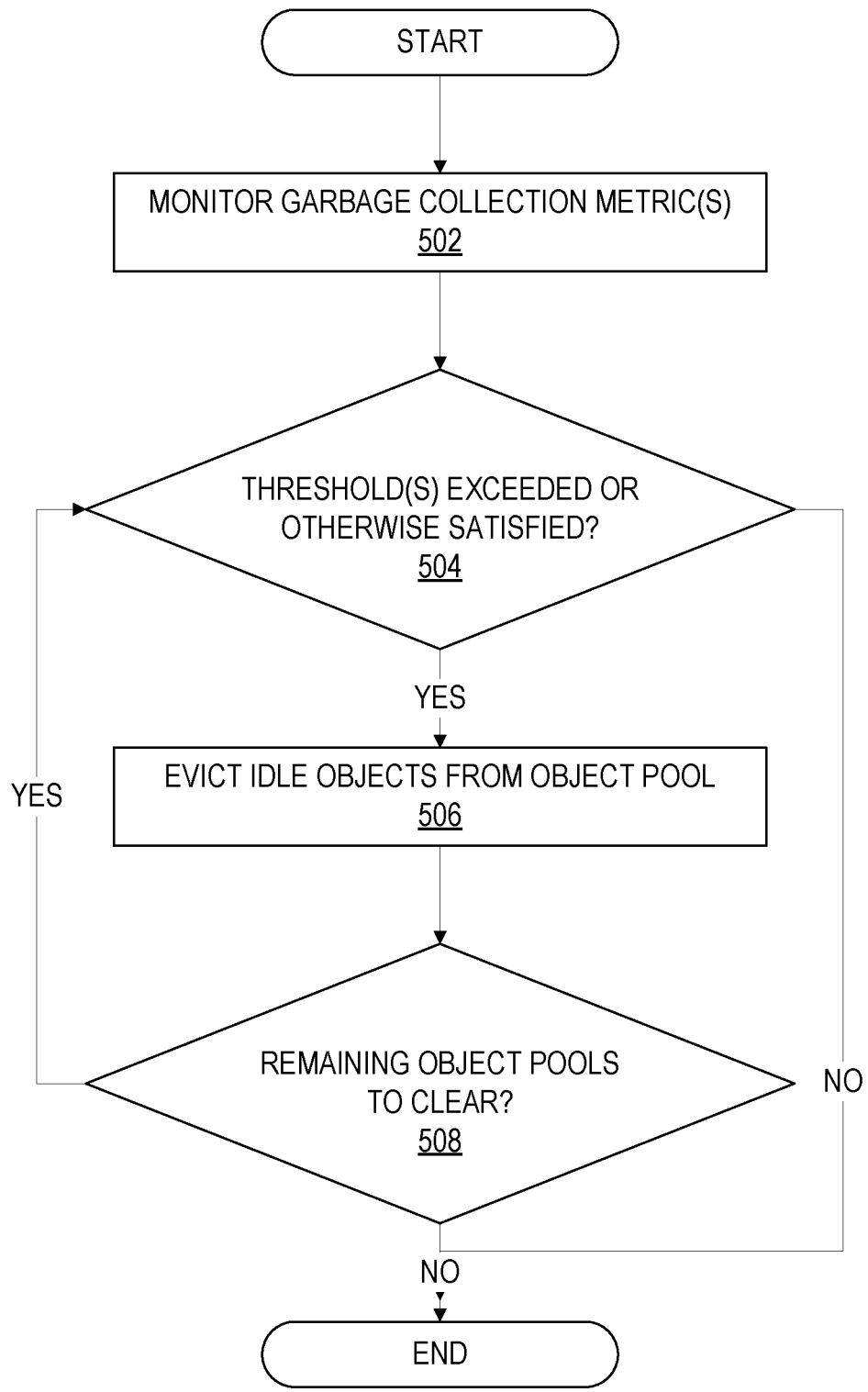
FIG. 5 illustrates an example set of operations for evicting objects from object pools based on garbage collection pressure in accordance with some embodiments.

FIG. 5 illustrates an example set of operations for evicting objects from object pools based on garbage collection pressure in accordance with some embodiments. One or more operations illustrated in FIG. 5 may be modified, rearranged, or omitted all together. Accordingly, the particular sequence of operations illustrated in FIG. 5 should not be construed as limiting the scope of one or more embodiments.

Referring to FIG. 5, runtime environment 113 monitors a set of one or more garbage collection metrics that track garbage collection events for reclaiming memory allocated for objects (operation 502). Example garbage collection metrics may include, but are not limited to, the frequency with which a full garbage collection is triggered, the frequency with which minor garbage collections are triggered, and the percentage of CPU time spent performing garbage collection. In some embodiments, the runtime environment schedules a job to periodically check the garbage collection metrics. Scheduled jobs may be obtained and executed by available threads as previously discussed.

Runtime environment 113 further determines whether the set of one or more garbage collection metrics satisfy one or more thresholds (operation 504). For example, if the total percentage of CPU time spent performing garbage collection exceeds 5% for a program, the runtime environment 113 may determine that the threshold is satisfied. Java programs are typically tuned and optimized to keep the percent time in garbage collection to 5% or less. However, for other programs or environments, the threshold may vary and be set to the typical percent time in garbage collection for the program. As another example, runtime environment 113 may compare the count of total and/or full garbage collection events performed within a threshold timeframe. If the number exceeds a threshold, then runtime environment 113 may determine that the threshold is satisfied.

If the thresholds are not satisfied (e.g., the percentage of CPU time spent in garbage collection does not exceed 5%), then the process may end without evicting any idle objects from the object pools. Otherwise, runtime environment 113 selects an object pool and evicts the idle objects (operation 506). In some embodiments, all idle objects, if any, within the pool are evicted to maximally reduce the pressure on the garbage collector caused by idle objects on the heap. In other embodiments, a subset of idle objects may be evicted. For example, a minimum threshold (e.g., one) idle object may be left in the pool.

Runtime environment 113 next determine whether there are any remaining object pools to clear (operation 508). If so, then the process returns to operation 506 for the next object pool and iterates through the operations until each remaining object pool has been cleared of idle objects.

3.4 Example Combined Approaches

Two or more of the object pool sensitivities described above may be combined such that object pools are sensitive to new object creation, memory pressure, and/or garbage collection pressure. Thus, object pools may be sensitive to a variety of performance attributes.

In some embodiments, a combined approach includes maintaining a set of per-object pool flags and a global flag. The set of per-object pool flags, referred to herein as "Created" flags, track which object pools have created new objects within a threshold timeframe. A single Created flag may be maintained per object pool. The global flag may track whether memory pressure and/or garbage collection pressure has exceeded a threshold. A single global flag may be maintained for all object pools. A flag may be a single bit Boolean value where the value "1" indicates true and the value "0" is equal to false. However, the datatype of the flag may vary depending on the particular implementation.

Figure 6:
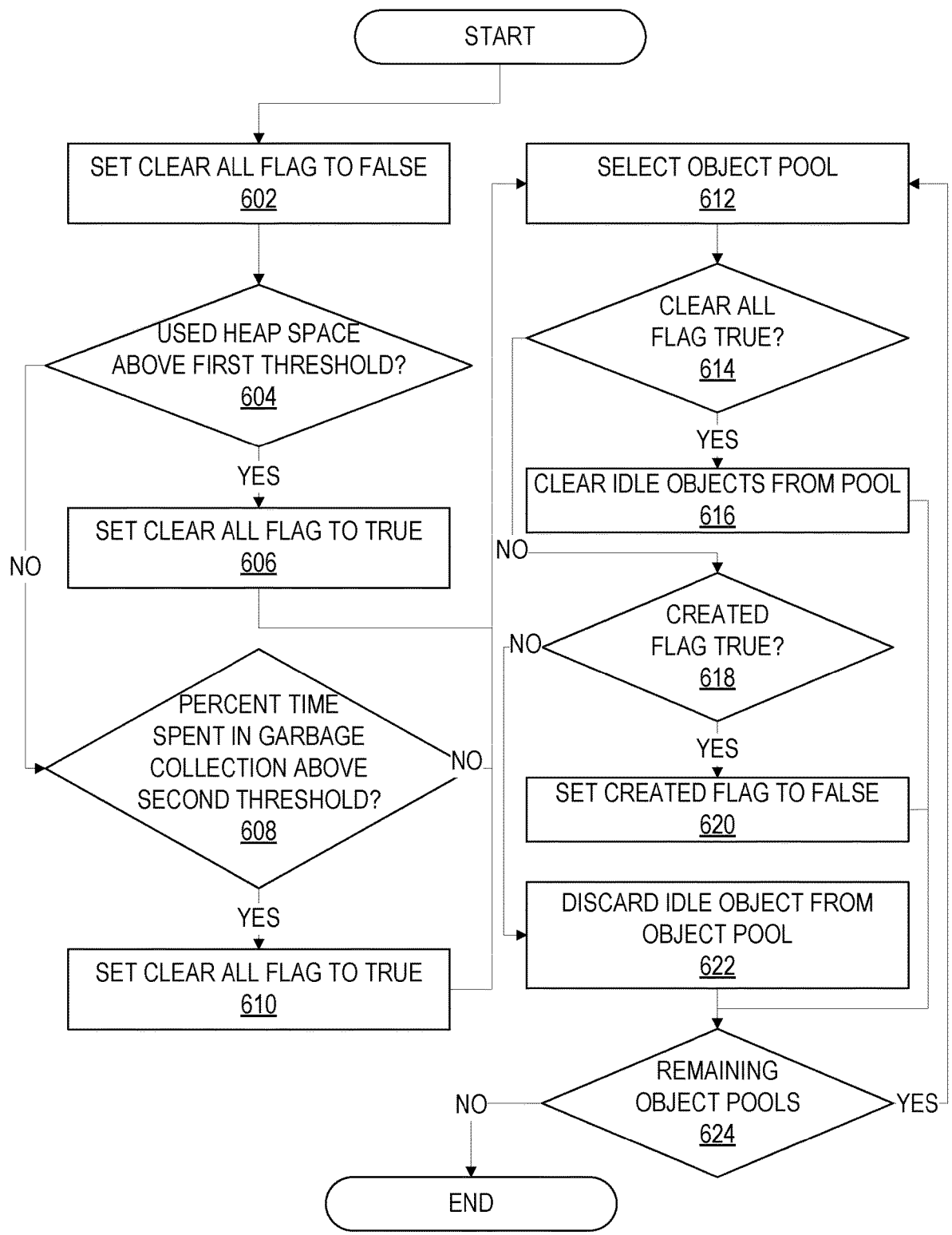
FIG. 6 illustrates an example set of operations for evicting objects from object pools using a set of per-object pool flags and a global flag in accordance with some embodiments.

FIG. 6 illustrates an example set of operations for evicting objects from object pools using a set of per-object pool flags and a global flag in accordance with some embodiments. One or more operations illustrated in FIG. 6 may be modified, rearranged, or omitted all together. Accordingly, the particular sequence of operations illustrated in FIG. 6 should not be construed as limiting the scope of one or more embodiments.

In some embodiments, runtime environment 113 schedules a job to periodically (e.g., every second or some other interval) execute the set of operations depicted in FIG. 6. An available thread may pick up the job, execute the set of operations, and return to the thread pool. Thus, the program does not waste the thread when it is not running the job.

Referring to FIG. 6, a thread sets the Clear All flag to false if not already false (operation 602). As previously indicated, the Clear All flag is used as an alert when runtime environment 113 is experiencing memory and/or garbage collection pressure. The Clear All flag may be a global flag that is applicable to all object pools across a program. In other embodiments, the clear all flag may apply to a subset of object pools allocated for the program.

After setting the Clear All flag to false, the thread determines if the used heap space after a full garbage collection is above a first threshold (operation 604). As previously mentioned, the threshold may be set to the typical heap space after a full garbage collection, which may vary depending on the runtime environment. Java heaps are sized so that the program typically uses 50% of the heap space after a full garbage collection. However, the first threshold may vary depending on the particular implementation and be configurable by an end user, such as an application developer.

If the used heap space is above the first threshold, then the thread sets the Clear All flag to true (operation 606).

If the used heap space is not above the first threshold, then the thread determines whether the percent of CPU time spent in garbage collection is above a second threshold (operation 608). As previously mentioned, the threshold may be set to the typical percent time spent in garbage collection for the program, which may vary depending on the runtime environment and the program being executed. Java programs are typically tuned and optimized to spend 5% or less time in garbage collection. However, the second threshold may vary depending on the particular implementation and be configurable by an end user, such as an application developer.

If the percent of CPU time spent in garbage collection is above the second threshold, then the thread sets the Clear All flag to true (operation 610). In other embodiments, the thread may compare other garbage collection metrics in addition or as an alternative to the percent of CPU time spent in garbage collection during operation 606 and 608. For example, the thread may determine whether the frequency with which full garbage collection events and/or minor garbage collection events are triggered are above a threshold such as described in the previous subsection. If the one or more thresholds are satisfied, then the thread may set the Clear All flag to true.

The thread next selects an object pool on the heap (operation 612). The object pools may be processed in any order, which may vary depending on the implementation.

For the selected object pool, the thread determines whether the Clear All flag is true (operation 614).

If the Clear All flag is true, then the thread clears all of the idle objects from the object pool (operation 616). An idle object that has been cleared may be marked for deletion or immediately deleted from memory. The space consumed by the evicted idle object may be reclaimed and used for other purposes. In other embodiments, rather than clearing all idle objects, a minimum threshold of idle objects may be maintained in the object pool. For example, all idle objects but one may be cleared from an object pool if the Clear All flag is true. After the idle objects have been cleared, processing on the object pool may stop until the job runs again.

If the Clear All flag is false, then the thread determines whether the Created flag is true (operation 618). The Created flag may be set to true each time the object pool has created a new object.

If the Created flag is true, then the thread sets the Created flag to false (operation 620). In this case, the thread does not delete any idle objects from the object pool.

If the Created flag is false, then the thread discards one idle object from the object pool (operation 622). Thus, a false value for the Created flag deletes fewer objects than a true value for the Clear All flag, allowing for a more gradual eviction of idle objects when memory and garbage collection pressure is relatively low. In other embodiments, two or more idle objects may be evicted during this operation.

The thread next determines whether there are any remaining object pools to analyze (operation 624). If so, then the process returns to operation 612 and iterates through the operations until each remaining object pool on the heap has been processed. Once all the object pools have been processed, the thread may be returned to the thread pool for processing other jobs.

4. Tuning Considerations 4.1 Idle Object Selection for Eviction

In the techniques described above, a subset of one or more idle objects may be evicted from a given object pool. There are several different options on which idle object the pool discards. Some of these options are described in further detail herein. However, the manner in which objects are selected may vary, depending on the particular implementation.

In some embodiments, object pools use a last-in first-out (LIFO) stack to hold the idle objects. A LIFO stack allows object pools to quickly discard the most recently used idle object, which is the object on top of the stack. In many cases, the most recently used object corresponds to the most recently created object, increasing the likelihood that the idle object is still in the young generation on the heap. In garbage collection-enabled environments, young generation objects are more easily cleaned up by garbage collectors as the minor garbage collection phase, previously described, operates on the young generation in the heap.

In other embodiments, an object pool may discard the least recently used idle object. With a LIFO stack, the least recently used idle object is the one at the bottom of the stack. A benefit with this approach is that the least recently used idle object is least likely to be in a processor's cache, which may reduce the amount of data reloaded into the processor's cache during program runtime.

One complication with a stack-based implementation is that a stack allocates a node with every push and discards the node with every pop, which creates a significant amount of garbage, triggering garbage collection more frequently. In addition, caching the nodes in multi-threaded environments is difficult due to the ABA problem. The ABA problem arises from challenges in synchronizing concurrent operations across different threads accessing shared data. In particular, if a first thread reads a data object having value "A" from shared memory, a second thread may modify the value to "B" and back to "A" while the first thread is in a suspended state. When execution of the first thread resumes, it may determine that the data object has not changed since the value is the same, even though the second thread modified the value to "B" and back to "A", which may cause incorrect program behavior.

Rather than use a stack, object pools may be implemented using other data structures. In some embodiments, object pools may use a first-in first-out (FIFO) queue to hold the idle objects. A FIFO queue may be implemented as an array, which eliminates the allocation and discard of nodes with every push and pop. Thus, an array-based FIFO queue does not create garbage but still allows the least recently used idle object to be quickly discarded. The array-based FIFO queue also does not give rise to the ABA problem described above.

4.2 Thresholds and Memory Profiling

Memory profilers sample heap allocations to provide developers with snapshots into how a program is utilizing memory at different points in time. Typically, tracking every allocation is prohibitively expensive, which is why a sampling technique is used. One of the benefits of using the threshold timeframe to gradually reduce idle objects in a pool is that it prevents an object pool from quickly oscillating between creating and freeing objects. Thus, the allocations are much more likely to show up in memory profilers.

In some embodiments, the threshold values may be exposed to and configurable to a developer. For example, the developer may select a threshold timeframe in view of the sampling rate of a memory profiler to ensure or increase the likelihood that object pool allocations are captured by a memory profiler. Thus, the developer may gain a greater understanding in how the object pools are allocating objects in memory.

Additionally or alternatively, different thresholds may be set for different object pools. For example, runtime environment 113 may assign a high priority pool a longer threshold timeframe to allow for a more gradual eviction of idle objects than for a lower priority pool. As another example, a high priority pool may have a higher minimum threshold of idle objects that are maintained than a lower priority object pool.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Hardware Implementations

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
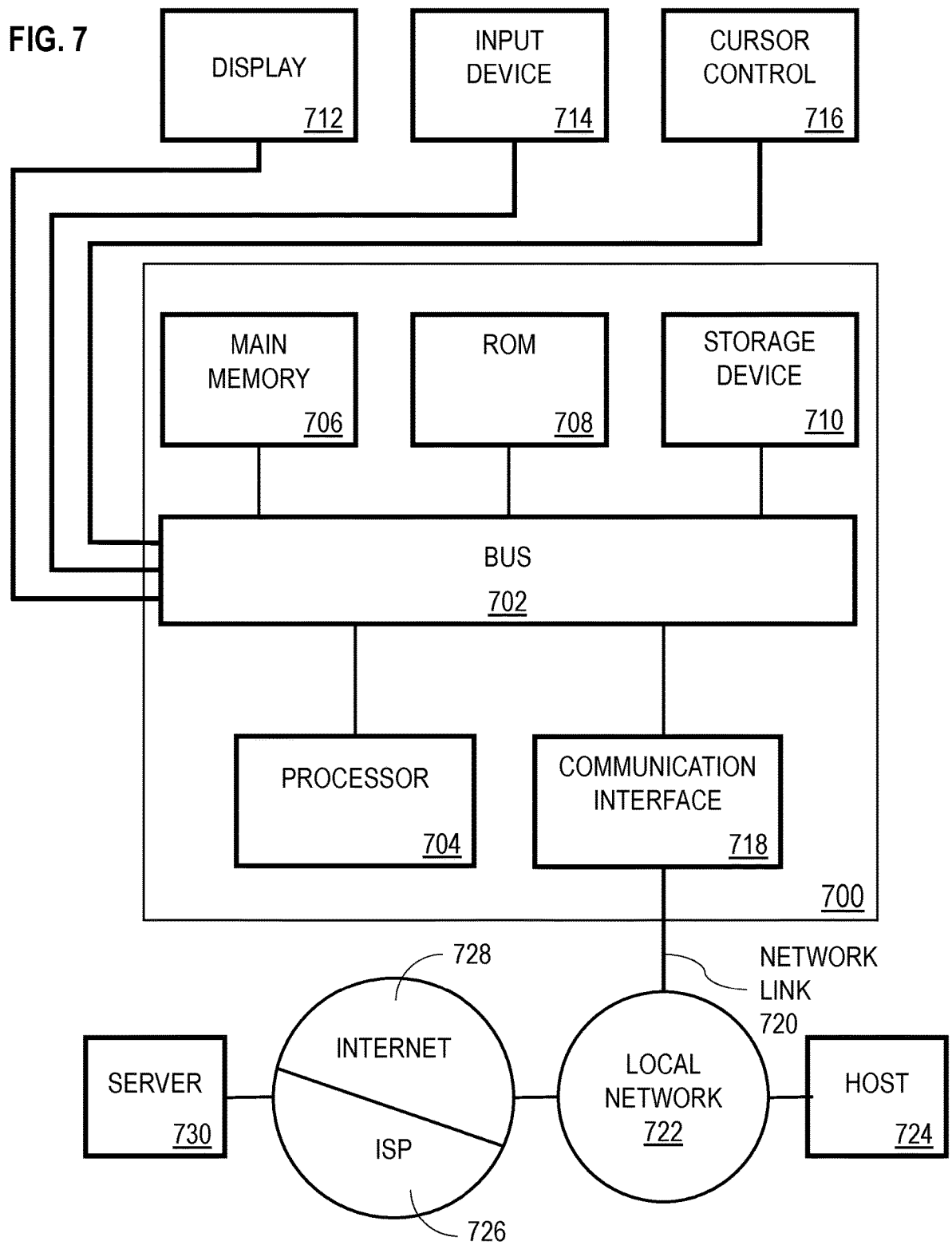
FIG. 7 shows a block diagram that illustrates a computer system in accordance with one or more embodiments.

For example, FIG. 7 is a block diagram that illustrates computer system 700 upon which an embodiment of the invention may be implemented. Computer system 700 includes bus 702 or other communication mechanism for communicating information, and a hardware processor 704 coupled with bus 702 for processing information. Hardware processor 704 may be, for example, a general purpose microprocessor.

Computer system 700 also includes main memory 706, such as a RAM or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes read only memory (ROM) 708 or other static storage device coupled to bus 702 for storing static information and instructions for processor 704. Storage device 710, such as a magnetic disk or optical disk, is provided and coupled to bus 702 for storing information and instructions.

Computer system 700 may be coupled via bus 702 to display 712, such as a cathode ray tube (CRT) or light emitting diode (LED) monitor, for displaying information to a computer user. Input device 714, which may include alphanumeric and other keys, is coupled to bus 702 for communicating information and command selections to processor 704. Another type of user input device is cursor control 716, such as a mouse, a trackball, touchscreen, or cursor direction keys for communicating direction information and command selections to processor 704 and for controlling cursor movement on display 712. Input device 714 typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a network line, such as a telephone line, a fiber optic cable, or a coaxial cable, using a modem. A modem local to computer system 700 can receive the data on the network line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions for managing object pools within a computing system, wherein the instructions, when executed by one or more hardware processors, cause:
    determining, for a respective object pool of a set of one or more object pools allocated in volatile or non-volatile storage of the computing system, whether a flag associated with the respective object pool indicates that a new object has been added to the respective object pool within a threshold timeframe;
    wherein the respective object pool includes a plurality of objects that are available for use by one or more clients of the respective object pool;
    wherein the flag is not set when no new objects have been added to the respective object pool within the threshold timeframe; and
    responsive to determining that the flag associated with the respective pool indicates that a new object has not been added to the respective object pool within the threshold timeframe, removing a subset of one or more objects of the plurality of objects from the respective object pool.

2. The media of claim 1, wherein removing the subset of one or more objects comprises removing one idle object of the plurality of objects from the respective object pool.

3. The media of claim 2, wherein at least one other idle object remains in the respective object pool subsequent to removing the one idle object.

4. The media of claim 1, wherein the instructions further cause: determining, for a second object pool in the set of one or more object pools, that a new object has been added to the second object pool within the threshold timeframe; and responsive to determining that the new object has been added within the threshold timeframe, refraining from removing any objects from the second object pool.

5. The media of claim 4, wherein determining that the new object has been added to the second pool within the threshold timeframe comprises: checking a second flag associated with the second object pool; wherein the second flag is set when new objects are added to the second object pool; responsive to determining that the new object has been added within the threshold timeframe, resetting the second flag; and periodically checking the second flag to determine whether or not to remove idle objects from the second object pool.

6. The media of claim 1, wherein the instructions further cause determining, for a second object pool in the set of one or more object pools, that a new object has not been added to the second object pool within a second threshold timeframe; and responsive to determining that the new object has not been added within the second threshold timeframe, removing a second subset of one or more objects from the second object pool; wherein the second threshold timeframe is different than the threshold timeframe for the respective object pool.

7. The media of claim 1, wherein the instructions further cause: subsequent to removing the subset of one or more objects from the respective pool, removing all idle objects from the respective pool responsive to determining at least one of memory utilization or garbage collection overhead being above a threshold.

8. One or more non-transitory computer-readable media storing instructions for managing object pools within a computing system, wherein the instructions, when executed by one or more hardware processors, cause:
    monitoring a set of one or more garbage collection metrics associated with garbage collection events for reclaiming memory allocated for objects;
    determining that the set of one or more garbage collection metrics satisfied one or more thresholds;
    responsive to determining that the set of one or more garbage collection metrics have satisfied the one or more thresholds:
        removing all idle objects from the respective object pool until only a threshold number of idle objects remain.

9. The media of claim 8, wherein determining that the set of one or more garbage collection metrics have satisfied the one or more thresholds comprises determining that a percent time is above a threshold.

10. The media of claim 8, wherein determining that the set of one or more garbage collection metrics have satisfied the one or more thresholds comprises determining that a frequency with which a garbage collection event is triggered is above a threshold.

11. The media of claim 8, wherein the threshold is zero and all of the idle objects from the respective object pool are removed such that no idle object remain in the respective object pool.

12. The media of claim 8, wherein the instructions further cause: responsive to determining that the set of one or more garbage collection metrics have satisfied the one or more thresholds:
    identifying a second set of one or more idle objects in a second object pool; and
    removing the second set of one or more idle objects from the second object pool.

13. The media of claim 8, wherein the instructions further cause: monitoring one or more memory utilization metrics; wherein idle objects are cleared from at least one object pool responsive to determining that the one or more memory utilization metrics have satisfied a second set of one or more thresholds.

14. The media of claim 13, wherein a flag for clearing idle objects is set responsive to determining that the set of one or more garbage collection metrics have satisfied the one or more thresholds or determining that the one or more memory utilization metrics have satisfied a second set of one or more thresholds.

15. A method for managing object pools within a computing system, the method comprising:
    determining, for a respective object pool of a set of one or more object pools allocated in volatile or non-volatile storage of the computing system, whether a flag associated with the respective object pool indicates that a new object has been added to the respective object pool within a threshold timeframe;

wherein the respective object pool includes a plurality of objects that are available for use by one or more clients of the respective object pool;

wherein the flag is not set when no new objects have been added to the respective object pool within the threshold timeframe; and responsive to determining that the flag associated with the respective pool indicates that a new object has not been added to the respective object pool within the threshold timeframe, removing a subset of one or more objects of the plurality of objects from the respective object pool.

16. The method of claim 15, wherein removing the subset of one or more objects comprises removing one idle object of the plurality of objects from the respective object pool.

17. The method of claim 16, wherein at least one other idle object remains in the respective object pool subsequent to removing the one idle object.

18. The method of claim 15, further comprising determining, for a second object pool in the set of one or more object pools, that a new object has been added to the second object pool within the threshold timeframe; and responsive to determining that the new object has been added within the threshold timeframe, refraining from removing any objects from the second object pool.

19. The method of claim 15, further comprising determining, for a second object pool in the set of one or more object pools, that a new object has not been added to the second object pool within a second threshold timeframe; and responsive to determining that the new object has not been added within the second threshold timeframe, removing a second subset of one or more objects from the second object pool; wherein the second threshold timeframe is different than the threshold timeframe for the respective object pool.

20. The method of claim 15, further comprising subsequent to removing the subset of one or more objects from the respective pool, removing all idle objects from the respective pool responsive to determining at least one of memory utilization or garbage collection overhead being above a threshold.

* * * * *